United States Patent
Zhang et al.

(10) Patent No.: US 9,251,834 B2
(45) Date of Patent: Feb. 2, 2016

(54) MAGNETIC RECORDING MEDIUM AND MAGNETIC STORAGE APPARATUS

(71) Applicant: SHOWA DENKO K.K., Tokyo (JP)

(72) Inventors: Lei Zhang, Chiba (JP); Tetsuya Kanbe, Chiba (JP); Yuji Murakami, Chiba (JP); Kazuya Niwa, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/503,503

(22) Filed: Oct. 1, 2014

(65) Prior Publication Data

US 2015/0117166 A1    Apr. 30, 2015

(30) Foreign Application Priority Data

Oct. 28, 2013 (JP) ................................ 2013-223149

(51) Int. Cl.
G11B 11/00 (2006.01)
G11B 5/73 (2006.01)
G11B 5/65 (2006.01)
G11B 11/105 (2006.01)
G11B 5/00 (2006.01)

(52) U.S. Cl.
CPC ............... *G11B 5/7325* (2013.01); *G11B 5/65* (2013.01); *G11B 11/10584* (2013.01); *G11B 2005/0021* (2013.01)

(58) Field of Classification Search
USPC ............ 369/13.38, 13.06, 13.07, 13.08, 13.4, 369/13.5; 428/831.2, 843.5; 360/135, 110
See application file for complete search history.

(56) References Cited

U.S. PATENT DOCUMENTS

| | | | |
|---|---|---|---|
| 5,759,681 A * | 6/1998 | Hosoe et al. ................... 428/332 |
| 5,815,343 A * | 9/1998 | Ishikawa et al. ............ 360/97.22 |
| 6,001,447 A * | 12/1999 | Tanahashi et al. ......... 428/831.2 |
| 6,068,739 A | 5/2000 | Suzuki et al. |
| 2002/0018920 A1 * | 2/2002 | Yamamoto et al. ...... 428/694 TS |
| 2004/0161638 A1 * | 8/2004 | Maeda et al. ............... 428/694 T |
| 2011/0205862 A1 * | 8/2011 | Kanbe et al. ............... 369/13.32 |
| 2012/0113768 A1 * | 5/2012 | Kanbe et al. ............... 369/13.24 |
| 2012/0307398 A1 * | 12/2012 | Kanbe et al. ..................... 360/75 |
| 2014/0308542 A1 * | 10/2014 | Zhang et al. ............... 428/831.2 |
| 2014/0376127 A1 * | 12/2014 | Kanbe et al. ................... 360/110 |
| 2015/0009786 A1 * | 1/2015 | Kanbe et al. ............... 369/13.16 |
| 2015/0029830 A1 * | 1/2015 | Zhang et al. ................. 369/13.4 |
| 2015/0036242 A1 * | 2/2015 | Zhang et al. ................... 360/135 |

FOREIGN PATENT DOCUMENTS

| JP | H11-353648 | 12/1999 |
| JP | 2009-158054 | 7/2009 |
| JP | 2012-048792 | 3/2012 |

OTHER PUBLICATIONS

En Yang et al., "L10 FePt—oxide columnar perpendicular media with high coercivity and small grain size", Journal of Applied Physics 104, 023904 (2008).

Ikuya Tagawa et al., "Relationship Between High Density Recording Performance and Particle Coercivity Distribution", IEEE Transactions on Magnetics, vol. 27, No. 6, pp. 4975-4977, Nov. 1991.

* cited by examiner

*Primary Examiner* — Tan X Dinh (74) *Attorney, Agent, or Firm* — IPUSA, PLLC

(57) ABSTRACT

A magnetic recording medium includes a substrate, a magnetic layer including an alloy having an $L1_0$ type crystal structure as a main component thereof, and a plurality of underlayers arranged between the substrate and the magnetic layer. The plurality of underlayers include at least one crystalline underlayer which has a (100) orientation, and includes W as a main component thereof and one or more kinds of elements selected from a group consisting of Fe, Ni, Co, Hf, Zr, Y, Be, Ce, La, and Sc.

18 Claims, 2 Drawing Sheets

MAGNETIC RECORDING MEDIUM AND MAGNETIC STORAGE APPARATUS

CROSS-REFERENCE TO RELATED APPLICATIONS

This application is based upon and claims the benefit of priority of Japanese Patent Application No. 2013-223149 filed on Oct. 28, 2013, the entire contents of which are incorporated herein by reference.

BACKGROUND OF THE INVENTION

1. Field of the Invention

The present invention relates to a magnetic recording medium and a magnetic storage apparatus.

2. Description of the Related Art

Recently, demands to increase storage capacities of HDDs (Hard Disk Drives) are increasing. As one means of satisfying such demands, a heat-assisted recording method has been proposed. The heat-assisted recording method performs recording with respect to a magnetic recording medium using a magnetic head mounted with a laser light source, by heating the magnetic recording medium by the magnetic head.

The heat-assisted recording method can reduce the coercivity of the magnetic recording medium by heating the magnetic recording medium and enable use of a magnetic material having a high crystal magnetic anisotropy constant Ku (hereinafter also referred to as a "high-Ku material") for a magnetic layer of the magnetic recording medium. For this reason, the magnetic grain size of the magnetic layer can be reduced while maintaining thermal stability, and a surface recording density on the order of 1 Tbits/inch$^2$ can be achieved. The high-Ku material includes ordered alloys, such as $L1_0$ type FePt alloys, $L1_0$ type CoPt alloys, $L1_1$ type CoPt alloys, or the like.

In addition, in order to isolate (or separate) crystal grains of the ordered alloy, the magnetic layer is added with a grain boundary material, such as an oxide including $SiO_2$, $TiO_2$, or the like, or C, BN, or the like. By employing a granular structure in which the magnetic crystal grains are separated at the grain boundary, an exchange coupling between the magnetic grains is reduced compared to a case in which the grain boundary material is not added, and a high medium SNR (Signal-to-Noise Ratio) can be achieved.

For example, En Yang et al., "$L1_0$ FePt-oxide columnar perpendicular media with high coercivity and small grain size", Journal of Applied Physics 104, 023904 (2008), propose adding 38% $SiO_2$ to FePt, in order to reduce the magnetic grain diameter to 5 nm. En Yang et al. also describe that the magnetic grain diameter can further be reduced to 2.9 nm by increasing the added content of $SiO_2$ to 50%.

In order to obtain a magnetic recording medium having a high perpendicular magnetic anisotropy and employing the heat-assisted recording method, the $L1_0$ type ordered alloy within the magnetic layer preferably has a good (001) orientation. Because the orientation of the magnetic layer can be controlled by an underlayer, a suitable underlayer is required to make the $L1_0$ type ordered alloy within the magnetic layer to have the good (001) orientation.

For example, Japanese Laid-Open Patent Publication No. 11-353648 describes that the good (001) orientation of the $L1_0$ type ordered alloy within the magnetic layer can be achieved using a MgO underlayer.

In addition, Japanese Laid-Open Patent Publication No. 2009-158054, for example, describes that the (001) orientation of the $L1_0$ type FePt magnetic layer can further be improved by forming, on a crystal grain control layer made of a Cr—Ti—B alloy or the like having a bcc (body centered cubic) structure, a MgO intermediate layer that achieves both crystal orientation control and low heat conduction.

For example, Japanese Laid-Open Patent Publication No. 2012-048792 describes an example in which Mo-5 at % Mo/Co is used for the underlayer.

On the other hand, a microwave-assisted recording method has been proposed as the next-generation recording method. The microwave-assisted recording method performs recording on the magnetic recording medium by applying a high-frequency magnetic field from the magnetic head to the magnetic layer so as to tilt a magnetization direction from an axis of easy magnetization, in order to locally switch the magnetization of the magnetic layer and record magnetic information.

Similarly as in the case of the heat-assisted recording method, the microwave-assisted recording method can use a high-Ku material, such as the $L1_0$ type alloy, for the magnetic layer of the magnetic recording medium. For this reason, the magnetic grain size of the magnetic layer can be reduced while maintaining thermal stability.

In a magnetic storage apparatus employing the heat-assisted recording method or the microwave-assisted recording method described above, there are demands to simultaneously reduce the magnetic crystal grain size in the magnetic recording medium and sufficiently reduce the exchange coupling between the magnetic crystal grains, in order to obtain a high medium SNR. The above described method of adding the grain boundary material, such as $SiO_2$, C, or the like, to the magnetic layer, is an effective method of obtaining the high medium SNR.

However, when a large amount of the grain boundary material is added in order to obtain a sufficiently high medium SNR in the magnetic storage apparatus, ordering of the crystal grains (hereinafter also referred to as "magnetic layer crystal grains") of the $L1_0$ type alloy included in the magnetic layer, such as the crystal grains of the FePt alloy, for example, deteriorates, to thereby deteriorate the crystal magnetic anisotropy constant Ku.

SUMMARY OF THE INVENTION

Embodiments of the present invention may provide a magnetic recording medium employing the heat-assisted recording method or the microwave-assisted recording method, and a magnetic storage apparatus including such a magnetic recording medium, which can improve the medium SNR without deteriorating the ordering of crystal grains forming an $L1_0$ type alloy included in a magnetic layer.

According to one aspect of the embodiment, a magnetic recording medium may include a substrate; a magnetic layer including an alloy having an $L1_0$ type crystal structure as a main component thereof; and a plurality of underlayers arranged between the substrate and the magnetic layer, wherein the plurality of underlayers include at least one crystalline underlayer which has a (100) orientation, and includes W as a main component thereof and one or more kinds of elements selected from a group consisting of Fe, Ni, Co, Hf, Zr, Y, Be, Ce, La, and Sc.

According to another aspect of the embodiment, a magnetic storage apparatus may include the magnetic recording medium described above, and a head configured to write information on and read information from the magnetic recording medium.

Other objects and further features of the present invention will be apparent from the following detailed description when read in conjunction with the accompanying drawings.

DESCRIPTION OF THE PREFERRED EMBODIMENTS

A description will be given of a magnetic recording medium and a magnetic storage apparatus in each embodiment of the present invention, by referring to the drawings. The present invention is not limited to the described embodiments, and various variations, modification, and substitutions may be made without departing from the scope of the present invention.

A description will be given of a configuration of an example of a magnetic recording medium in one embodiment.

The magnetic recording medium in one embodiment includes a substrate, a magnetic layer including an alloy having an $L1_0$ type crystal structure as a main component thereof, and a plurality of underlayers arranged between the substrate and the magnetic layer. Amongst the plurality of underlayers, at least one underlayer may be crystalline and include W having a (100) orientation. The crystalline underlayer including W may include W as a main component thereof, and one or more kinds of elements selected from a group that includes Fe, Ni, Co, Hf, Zr, Y, Be, Ce, La, and Sc.

In a case in which the magnetic layer including crystal grains of an FePt alloy or the like having the $L1_0$ type crystal structure is formed on the underlayer and the crystal grain diameter of the underlayer is large, a plurality of crystal grains of the alloy having the $L1_0$ type crystal structure are grown on a single crystal grain of the underlayer. In this case, the crystal grain diameter of the magnetic layer becomes non-uniform, and a variance of the crystal grain diameter becomes large.

On the other hand, according to the magnetic recording medium in one embodiment, the crystal grain diameter of the underlayer can be made small. Hence, one crystal grain of the magnetic layer grows on one crystal grain of the underlayer, and the so-called "one-to-one growth" is promoted. In addition, because the crystal grain diameter of the underlayer can be made small and uniform, the variance of the crystal grain diameter of the magnetic layer can be made small. At the same time, the medium SNR can be reduced when this magnetic recording medium is provided in the magnetic storage apparatus.

In addition, according to the magnetic layer in one embodiment, it is possible to promote isolation of the crystal grains, reduce the exchange coupling between the crystal grains, and reduce an SFD (Switching Field Distribution). Hence, when a magnetic recording medium having the magnetic layer that exhibits such effects is provided in a magnetic storage apparatus, the SNR can be improved.

In one embodiment, a total content of one or more added elements (hereinafter also referred to as "a total content of the added elements") included in the crystalline underlayer including W as a main component thereof is preferably within a range of 1 at % to 40 at %, where the one or more kinds of added elements is/are selected from the group that includes Fe, Ni, Co, Hf, Zr, Y, Be, Ce, La, and Sc. Otherwise, in a case in which the total content of the added elements exceeds 40 at %, the orientation of the underlayer may deteriorate, and in a case in which the total content of the added elements is less than 1 at %, the above described effects may not be obtained. More preferably, the total content of the one or more kinds of added elements selected from the group that includes Fe, Ni, Co, Hf, Zr, Y, Be, Ce, La, and Sc, included in the crystalline underlayer, is preferably within a range of 3 at % to 30 at %.

In one embodiment, a lattice misfit (or mismatch) amongst the plurality of underlayers is preferably 10% or less, in order to stabilize the electromagnetic conversion characteristic (or recording characteristic) of the magnetic recording medium. In addition, in order to adjust the lattice misfit, one or more kinds of elements selected from a group that includes Mo, Ta, Nb, Ti, V, and Cr is/are preferably added to the crystalline underlayer including W as the main component thereof. In this case, the content of the one or more elements added to the crystalline underlayer in order to adjust the lattice misfit is not limited to a particular amount.

In one embodiment, a growth surface of the crystalline underlayer including W as the main component thereof is preferably prevented from becoming oxidized, in order to more positively obtain the (100) orientation of the crystalline underlayer. This is because the (100) orientation of the crystalline underlayer including W as the main component thereof may deteriorate and become amorphous when the growth surface of the crystalline underlayer is oxidized.

In one embodiment, an orientation control underlayer is preferably provided under the crystalline underlayer including W as the main component thereof, in order to more positively obtain the (100) orientation of the crystalline underlayer. A material used for the orientation control underlayer is not limited to a particular material. For example, the orientation control underlayer is preferably made of one or more kinds of metals or alloys selected from a group that includes Cr (or Cr metal), alloys having a BCC (Body Centered Cubic) structure and including Cr as a main component thereof, and alloys having a B2 structure.

Examples of the alloy having the BCC structure and having Cr as the main component thereof include CrMn, CrMo, CrW, CrV, CrTi, CrRu, or the like, for example. In addition, the crystal grain size, the variance of the crystal grain size, or the like of the crystalline underlayer including W as the main component thereof can be improved by adding B, Si, C, or the like to the orientation control underlayer that is made of Cr or the alloy having the BCC structure and including Cr as the main component thereof. When adding B, Si, C, or the like to the orientation control underlayer, a total content of the added element or elements is preferably within a range such that the (100) orientation of the orientation control underlayer itself does not deteriorate.

In addition, examples of the alloys having the B2 structure include RuAl, NiAl, or the like, for example.

Next, a description will be given of the magnetic layer. In one embodiment, the magnetic layer is made of an alloy having an $L1_0$ type crystal structure as a main component thereof, in order to obtain a high crystal magnetic anisotropy constant Ku. Examples of such an alloy having the $L1_0$ type crystal structure include FePt alloys, CoPt alloys, or the like, for example.

In one embodiment, a heat treatment is preferably carried out when forming the magnetic layer, in order to promote the ordering of the magnetic layer. A heating (or ordering) temperature of this heat treatment may be reduced by adding an element such as Ag, Au, Cu, Ni, or the like to the alloy having the $L1_0$ type crystal structure. The addition of such elements to the alloy having the $L1_0$ type crystal structure can reduce the heating (or substrate) temperature at the time of forming the magnetic layer to a temperature within a range of approximately 400° C. to approximately 500° C., for example.

In addition, in the magnetic layer, the crystal grains of the alloy having the $L1_0$ type crystal structure are preferably magnetically isolated (or separated). For this reason, the magnetic layer preferably includes one or more kinds of materials selected from a group that includes $SiO_2$, $TiO_2$, $Cr_2O_3$, $Al_2O_3$, $Ta_2O_5$, $ZrO_2$, $Y_2O_3$, $CeO_2$, MnO, TIC, ZnO, $B_2O_3$, C, B, and BN. By including one or more such materials in the magnetic layer, the crystal grains are magnetically isolated in a more positive manner, the exchange coupling between the crystal grains are more positively reduced, and the medium SNR can further be improved.

In order to promote the ordering of the magnetic layer having the $L1_0$ type crystal structure, a heat treatment that heats to approximately 600° C. is preferably carried out at the time of forming the magnetic layer of the magnetic recording medium employing the heat-assisted recording method. In order to suppress diffusion at a boundary between the underlayer and the magnetic layer, a barrier layer made of a material having a NaCl type structure is preferably provided between the magnetic layer and the crystalline underlayer including Mo as the main component thereof.

The material having the NaCl type structure used for the barrier layer is not limited to a particular material. For example, the material having the NaCl type structure used for the barrier layer may include one or more kinds compounds selected from a group that includes MgO, TiO, NiO, TiN, TiC, TaN, HfN, NbN, ZrC, HfC, TaC, and NbC.

In one embodiment, the magnetic recording medium having the layer structure described above and employing the heat-assisted recording method, may include additional layers, if necessary.

For example, the magnetic recording medium preferably includes a DLC (Diamond-Like Carbon) protection layer provided on the magnetic layer.

The method of forming the DLC protection layer is not limited to a particular method. For example, an RF-CVD (Radio Frequency-Chemical Vapor Deposition) method, an IBD (Ion Beam Deposition) method, an FCVA (Filtered Cathodic Vacuum Arc) method, or the like may be used to form the DLC protection layer. The RF-CVD method may deposit the DLC protection layer by decomposing a source gas including hydrocarbon by high-frequency plasma. The IBD method may deposit the DLC protection layer by ionizing a source gas by electrons emitted from a filament. The FCVA method may deposit the DLC protection layer using a solid carbon (C) target, without the use of a source gas.

A thickness of the DLC protection layer is not limited to a particular thickness, however, the thickness of the DLC protection layer is preferably within a range of 1 nm to 6 nm, for example. Otherwise, in a case in which the thickness of the DLC layer is less than 1 nm, a floating characteristic of a magnetic head may deteriorate, and in a case in which the thickness of the DLC layer is greater than 6 nm, a magnetic spacing becomes large, and the medium SNR may deteriorate.

A lubricant layer made of a fluororesin, such as a perfluoropolyether resin, may be coated on the DLC protection layer.

A heat sink layer is preferably provided to quickly cool the magnetic layer. The heat sink layer may be made of a metal having a high heat conductivity, such as Ag, Cu, Al, Au, or the like, or made of an alloy including, as a main component thereof, a metal having a high heat conductivity, such as Ag, Cu, Al, Au, or the like. According to the heat-assisted recording method, the magnetic layer of the magnetic recording medium is heated by laser and quickly cooled thereafter, and it is preferable to suppress spreading of a heated spot. For this reason, the provision of the heat sink layer is preferable in that a width of a magnetic transition region can be reduced, and the medium noise can be reduced. A location where the heat sink layer is provided is not limited to a particular location. For example, the heat sink layer may be provided under the orientation control underlayer, or between the orientation control underlayer and the barrier layer.

In addition, a soft magnetic underlayer may be provided in order to improve a write characteristic. A material used for the soft magnetic underlayer is not limited to a particular material. For example, the soft magnetic underlayer may be made of an amorphous alloy, such as CoTaZr, CoFeTaB, CoFeTaSi, CoFeTaZr, or the like, a microcrystalline alloy, such as FeTaC, FeTaN, or the like, and a polycrystalline alloy, such as NiFe, or the like. The soft magnetic underlayer may be formed by a single layer of such alloys, or have a stacked multi-layer structure in which two layers of such alloys are antiferromagnetically coupled via an Ru layer having a suitable thickness.

Other layers, such as a seed layer, a bonding layer, or the like may be additionally provided, if necessary.

In one embodiment, the magnetic recording medium described above may be suitably used as a magnetic recording medium employing the heat-assisted recording method or the microwave-assisted recording method.

According to the magnetic recording medium in one embodiment, by providing the magnetic layer on a predetermined underlayer, the medium SNR of the magnetic storage apparatus including the magnetic recording medium can be improved without deteriorating the ordering of the crystal grains of the alloy having the $L1_0$ type crystal structure and included in the magnetic layer.

Next, a description will be given of an example of a configuration of the magnetic storage apparatus in one embodiment. In one embodiment, it is assumed for the sake of convenience that the magnetic storage apparatus employs the heat-assisted recording method, however, the recording method employed in the magnetic storage apparatus is not limited to the heat-assisted recording method. The magnetic recording medium in one embodiment described above may be used in the magnetic storage apparatus employing the microwave-assisted recording method.

The magnetic storage apparatus in one embodiment may include the magnetic recording medium in one embodiment described above.

The magnetic storage apparatus may include, for example, a medium drive unit configured to rotate the magnetic recording medium, and a magnetic head having a near-field light generating element on a tip end part thereof. The magnetic storage apparatus may further include a laser generating unit configured to heat the magnetic recording medium, a waveguide configured to guide laser light emitted from the laser generating unit to the near-field light generating element, a head drive unit configured to move the magnetic head, and a signal processing system to process signals to be recorded on the magnetic recording medium and signals reproduced from the magnetic recording medium by the magnetic head.

Figure 1:
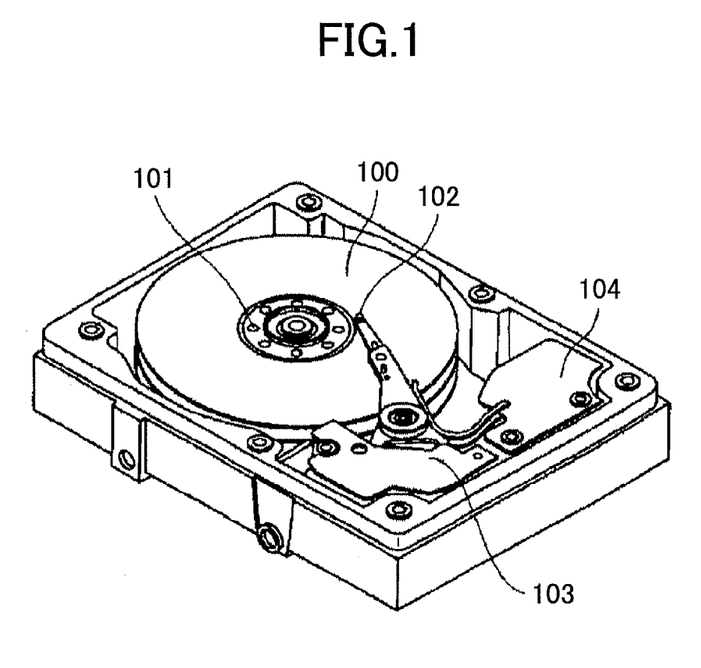
FIG. 1 is a perspective view schematically illustrating a configuration of an example of a magnetic storage apparatus in one embodiment of the present invention.

FIG. 1 is a perspective view schematically illustrating a configuration of an example of the magnetic storage apparatus in one embodiment of the present invention. The magnetic storage apparatus in one embodiment may have the configuration illustrated in FIG. 1. More particularly, the magnetic storage apparatus may include a magnetic recording medium 100 employing the heat-assisted recording method, a medium drive unit 101 that rotates the magnetic recording medium 100, a magnetic head 102, a head drive unit 103 that moves the magnetic head 102, and a signal processing system 104 that processes signals to be recorded on the magnetic recording medium 100 and signals reproduced from the magnetic recording medium 100 by the magnetic head 102.

Figure 2:
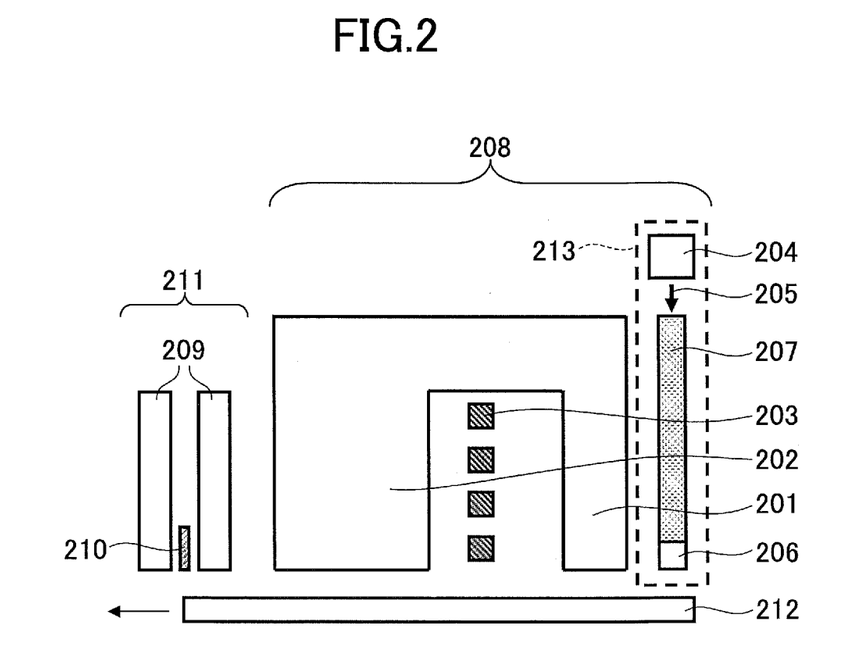
FIG. 2 is a diagram illustrating a configuration of an example of a magnetic head in one embodiment of the present invention.

FIG. 2 is a diagram illustrating a configuration of an example of a magnetic head in one embodiment of the present invention. The magnetic head illustrated in FIG. 2 may be used for the magnetic head 102 illustrated in FIG. 1. The magnetic head includes a recording head 208 and a reproducing head 211. The recording head 208 includes a main magnetic pole 201, an auxiliary magnetic pole 202, a coil 203 that generates a magnetic field, a laser diode (LD) 204 that forms a laser generating unit, and a waveguide 207 that guides laser light 205 generated from the laser diode 204 to a near-field light generating element 206. The reproducing head 211 includes a reproducing element 210 sandwiched between shields 209.

A magnetic recording medium 212 illustrated in FIG. 2 may be formed by the magnetic recording medium in one embodiment employing the heat-assisted recording method. Hence, by providing the magnetic layer on the predetermined underlayer, the medium SNR of the magnetic storage apparatus using the magnetic recording medium can be improved, without deteriorating the ordering of the crystal grains of the alloy having the $L1_0$ type crystal structure included in the magnetic layer.

PRACTICAL EXAMPLES

Next, a description will be given of practical examples of the present invention. However, the present invention is not limited to these practical examples which are merely examples.

Practical Examples Emb1-1 Through Emb1-20 and Comparison Example Cmp1-1

Figure 3:
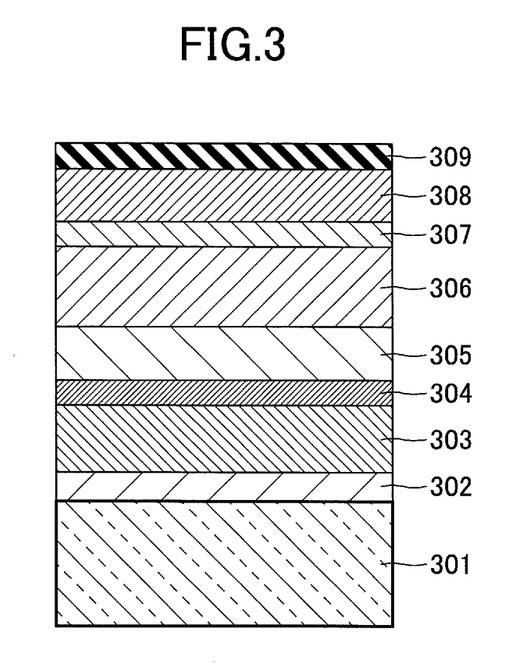
FIG. 3 is a cross sectional view schematically illustrating a layer structure of a magnetic recording medium according to practical examples emb1-1 through emb1-20.

FIG. 3 is a cross sectional view schematically illustrating a layer structure of a magnetic recording medium manufactured in accordance with practical examples Emb1. Practical examples Emb1-1 through Emb1-20 and a comparison example Cmp1-1 are manufactured in the following manner.

A seed layer 302 made of Cr-50 at % Ti and having a thickness of 25 nm is formed on a 2.5-inch (diameter) glass substrate 301, and a heat sink layer 303 made of Cu-0.5 at % Zr and having a thickness of 30 nm is formed on the seed layer 302. A seed layer 304 made of Cr-50 at % Ti and having a thickness of 10 nm is formed on the heat sink layer 303, and a substrate heating process (or heat treatment) is performed at 300° C. An orientation control underlayer 305 made of Cr-5 at % Mn-5 at % B and having a thickness of 10 nm is formed on the seed layer 304. Next, a crystalline underlayer 306 including W as a main component and having a thickness of 20 nm is formed on the orientation control underlayer 305. A barrier layer 307 made of MgO and having a thickness of 2 nm is formed on the crystalline underlayer 306. Thereafter, a substrate heating process (or heat treatment) is performed at 580° C., and a magnetic layer 308 made of 85 mol %(Fe-46 at % Pt)-15 mol % $SiO_2$ and having a thickness of 8 nm is formed on the barrier layer 305, and a protection layer 309 made of DLC and having a thickness of 3 nm is formed on the magnetic layer 308.

The crystalline underlayer 306 including W as the main component thereof has a different composition depending on the practical examples Emb1-1 through Emb1-20, as illustrated in Table 1. In the comparison example Cmp1-1, the crystalline underlayer including W as the main component thereof is formed by a W-15 at % Ta layer.

TABLE 1

| | Underlayer Including W as Main Component Thereof | Hc (kOe) | ΔHc/ Hc | <D> | σ/ <D> | SNR (dB) |
|---|---|---|---|---|---|---|
| Emb1-1 | W-16 at % Fe | 40.9 | 0.27 | 6.6 | 0.21 | 15.3 |
| Emb1-2 | W-15 at % Co | 40.3 | 0.25 | 6.7 | 0.22 | 15.5 |
| Emb1-3 | W-13 at % Ni | 41.3 | 0.25 | 6.8 | 0.19 | 15.2 |
| Emb1-4 | W-10 at % Zr | 36.4 | 0.27 | 6.1 | 0.21 | 15.5 |
| Emb1-5 | W-17 at % Hf | 37.5 | 0.28 | 6.7 | 0.22 | 15.4 |
| Emb1-6 | W-7 at % Y | 37.9 | 0.27 | 6.8 | 0.22 | 15.3 |
| Emb1-7 | W-17 at % Be | 38.0 | 0.29 | 6.5 | 0.21 | 15.6 |
| Emb1-8 | W-6 at % Ce | 38.1 | 0.29 | 6.7 | 0.22 | 15.1 |
| Emb1-9 | W-6 at % La | 39.3 | 0.28 | 6.3 | 0.22 | 15.5 |
| Emb1-10 | W-8 at % Sc | 38.9 | 0.27 | 6.6 | 0.21 | 16.0 |
| Emb1-11 | W-9 at % Co-3 at % Y | 37.5 | 0.28 | 6.5 | 0.19 | 15.3 |
| Emb1-12 | W-9 at % Ni-8 at % Mn | 41.6 | 0.26 | 6.6 | 0.19 | 15.8 |
| Emb1-13 | W-13 at % Fe-5 at % Mn | 41.1 | 0.27 | 6.4 | 0.23 | 15.5 |
| Emb1-14 | W-11 at % Co-6 at % Mn | 41.7 | 0.28 | 6.3 | 0.22 | 15.3 |
| Emb1-15 | W-10 at % Co-6 at % Ti | 37.0 | 0.28 | 6.3 | 0.22 | 15.9 |
| Emb1-16 | W-12 at % Co-5 at % Ta | 38.7 | 0.28 | 6.7 | 0.22 | 15.2 |
| Emb1-17 | W-13 at % Fe-6 at % Nb | 37.2 | 0.26 | 6.1 | 0.19 | 15.1 |
| Emb1-18 | W-10 at % Ni-5 at % V | 36.7 | 0.27 | 6.1 | 0.22 | 15.4 |
| Emb1-19 | W-10 at % Fe-7 at % Cr | 37.4 | 0.27 | 6.3 | 0.23 | 15.2 |
| Emb1-20 | W-14 at % Ni-8 at % Mo | 38.9 | 0.28 | 6.5 | 0.21 | 15.7 |
| Cmp1-1 | W-15 at % Ta | 30.7 | 0.36 | 6.6 | 0.27 | 13.8 |

The crystalline underlayer 306 including W as the main component thereof is formed by W-16 at % Fe in the practical example Emb1-1, W-15 at % Co in the practical example Emb1-2, W-13 at % Ni in the practical example Emb1-3, W-10 at % Zr in the practical example Emb1-4, W-17 at % Hf in the practical example Emb1-5, W-7 at % Y in the practical example Emb1-6, W-17 at % Be in the practical example Emb1-7, W-6 at % Ce in the practical example Emb1-8, W-6 at % La in the practical example Emb1-9, W-8 at % Sc in the practical example Emb1-10, W-9 at % Co-3 at % Y in the practical example Emb1-11, W-9 at % Ni-8 at % Mn in the practical example Emb1-12, W-13 at % Fe-5 at % Mn in the practical example Emb1-13, W-11 at % Co-6 at % Mn in the practical example Emb1-14, W-10 at % Co-6 at % Ti in the practical example Emb1-15, W-12 at % Co-5 at % Ta in the practical example Emb1-16, W-13 at % Fe-6 at % Nb in the practical example Emb1-17, W-10 at % Ni-5 at % V in the practical example Emb1-18, W-10 at % Fe-7 at % Cr in the practical example Emb1-19, and W-14 at % Ni-8 at % Mo in the practical example Emb1-20.

Table 1 illustrates a coercivity Hc (kOe) and a normalized coercivity variance ΔHc/Hc of each of the practical examples Emb1-1 through Emb1-20 and the comparison example Cmp1-1. The coercivity Hc is obtained from a magnetization curve that is measured at room temperature by applying a magnetic field of 7 T by an SQUID (Superconducting Quantum Interference Device). In addition, the normalized coercivity variance ΔHc/Hc is measured according to a method described in Ikuya Tagawa et al., "Relationship Between High Density Recording Performance And Particle Coercivity Distribution", IEEE Transactions on Magnetics, Vol. 27, No. 6, pp. 4975-4977, November 1991, for example. More particularly, in a major loop and a minor loop measured at room temperature by applying a maximum magnetic field of 7 T, a magnetic field at which the value of the magnetization becomes 50% of the saturated value is measured, and the normalized coercivity variance ΔHc/Hc is measured from a difference of the measured values by assuming that the Hc distribution is a Gaussian distribution. The normalized coercivity variance ΔHc/Hc is a parameter corresponding to the SFD (Switching Field Distribution), and the lower the value of the normalized coercivity variance ΔHc/Hc, the higher the medium SNR of the magnetic storage apparatus and thus more preferable.

From the results illustrated in Table 1, it is confirmed that the coercivity Hc is 36 kOe or higher for each of the practical examples Emb1-1 through Emb1-20, and higher than the coercivity Hc (30.7 kOe) obtained for the comparison example Cmp1-1 by approximately 6 kOe or more. In addition, it is confirmed that the coercivity Hc is 40 kOe or higher and very high for the practical examples Emb1-1 through Emb1-3 and Emb1-12 through Emb1-14. Further, the normalized coercivity variance ΔHc/Hc is 0.29 or lower for each of the practical examples Emb1-1 through Emb1-20, and low compared to the normalized coercivity variance ΔHc/Hc (0.36) obtained for the comparison example Cmp1-1.

Table 1 also illustrates an average grain diameter <D> of the magnetic layer and a grain diameter variance σ/<D> normalized by the average grain diameter <D>, that are obtained by TEM (Transmission Electron Microscope) observations, for each of the practical examples Emb1-1 through Emb1-20 and the comparison example Cmp1-1. It is confirmed that the average grain diameter <D> is in a range of 6.1 nm to 6.8 nm and approximately the same for each of the practical examples Emb1-1 through Emb1-20. In addition, it is confirmed that the grain diameter variance σ/<D> normalized by the average grain diameter <D> is 0.23 or less, which is a low value, for each of the practical examples Emb1-1 through Emb1-20. On the other hand, the average grain diameter <D> is 6.6 for the comparison example Cmp1-1, which is approximately the same as those of the practical examples Emb1-1 through Emb1-20. However, the grain diameter variance σ/<D> normalized by the average grain diameter <D> is 0.27 for the comparison example Cmp1-1, which is considerably high compared to those of the practical examples Emb1-1 through Emb1-20.

From the results illustrated in Table 1, it is confirmed that the crystal grain size and the grain size variance of the underlayer are reduced, and that the crystal grain sizes of the magnetic layer can be made uniform and the SFD can be reduced.

Next, lubricant layer made of a perfluoropolyether resin is coated on the surface of the magnetic recording medium employing the heat-assisted recording method and manufactured according to each of the practical examples Emb1-1 through Emb1-20 and the comparison example Cmp1-1. In addition, the magnetic recording medium according to each of the practical examples Emb1-1 through Emb1-20 and the comparison example Cmp1-1 is assembled within the magnetic storage apparatus illustrated in FIG. 1. Further, the magnetic head illustrated in FIG. 2 is used for the magnetic head 102 illustrated in FIG. 1.

Table 1 also illustrates the medium SNR (dB) measured by writing an all-"0" pattern signal onto the magnetic recording medium 212 by the magnetic head 102 having the configuration illustrated in FIG. 2 at a linear recording density of 1500 kFCI, in each magnetic storage apparatus assembled with the magnetic recording medium in accordance with each of the practical examples Emb1-1 through Emb1-20 and the comparison example Cmp1-1. The power input to the laser diode 204 is adjusted so that a track width (MWW: Magnetic Write Width) defined as a half-value width of a track profile becomes 60 nm.

From the results illustrated in Table 1, it is confirmed that the medium SNR is 15 dB or higher and considerably high for the practical examples Emb1-1 through Emb1-20. On the other hand, it is confirmed that the medium SNR for the comparison example Cmp1-1 is 13.8 dB and considerably lower than those of the practical examples Emb1-1 through Emb1-20.

Practical Examples Emb2-1 Through Emb2-12 and Comparison Example Cmp2-1

Figure 4:
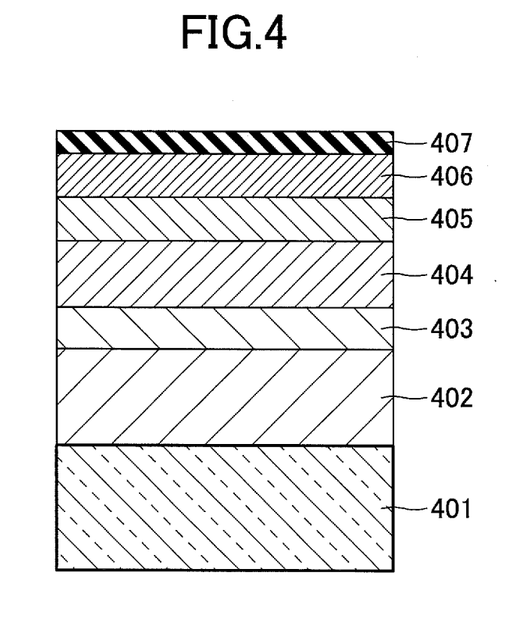
FIG. 4 is a cross sectional view schematically illustrating the layer structure of the magnetic recording medium according to practical examples emb2-1 through emb2-12.

FIG. 4 is a cross sectional view schematically illustrating a layer structure of a magnetic recording medium manufactured in accordance with practical examples Emb2. Practical examples Emb2-1 through Emb2-12 and a comparison example Cmp2-1 are manufactured in the following manner.

A seed layer 402 made of Ni-35 at % Ta and having a thickness of 25 nm is formed on a 2.5-inch (diameter) glass substrate 401, and a substrate heating process (or heat treatment) is performed at 300° C. An orientation control underlayer 403 made of Ru-50 at % Al and having a thickness of 20 nm is formed on the seed layer 402. Next, a crystalline underlayer 404 made of W-10 at % Co-5 at % Mn and having a thickness of 20 nm is formed on the orientation control underlayer 403. In addition, a barrier layer 405 having a thickness of 2 nm is formed on the crystalline underlayer 404. The barrier layer 405 has a different composition depending on the practical examples Emb2-1 through Emb2-12, as illustrated in Table 2.

TABLE 2

|  | Barrier Layer | Hc (kOe) | ΔHc/Hc |
| --- | --- | --- | --- |
| Emb2-1 | MgO | 41.0 | 0.26 |
| Emb2-2 | TiO | 37.8 | 0.28 |
| Emb2-3 | NiO | 39.1 | 0.26 |
| Emb2-4 | TiN | 40.2 | 0.28 |
| Emb2-5 | TaN | 37.2 | 0.26 |
| Emb2-6 | HfN | 38.7 | 0.28 |
| Emb2-7 | NbN | 39.3 | 0.26 |
| Emb2-8 | ZrC | 38.8 | 0.29 |
| Emb2-9 | HfC | 38.5 | 0.27 |
| Emb2-10 | NbC | 37.5 | 0.27 |
| Emb2-11 | TiC | 40.5 | 0.26 |
| Emb2-12 | TaC | 36.9 | 0.25 |
| Cmp2-1 | — | 19.0 | 0.38 |

The barrier underlayer 405 is formed by MgO in the practical example Emb2-1, TiO in the practical example Emb2-2, NiO in the practical example Emb2-3, TiN in the practical example Emb2-4, TaN in the practical example Emb2-5, HfN in the practical example Emb2-6, NbN in the practical example Emb2-7, ZrC in the practical example Emb2-8, HfC in the practical example Emb2-9, NbC in the practical example Emb2-10, TiC in the practical example Emb2-11, and TaC in the practical example Emb12-12. In addition, in the comparison example Cmp2-1, no barrier layer is provided.

Thereafter, a substrate heating process (or heat treatment) is performed at 600° C., and a magnetic layer 406 made of 82 mol % (Fe-45 at % Pt)-12 mol % $SiO_2$–6 mol % BN and having a thickness of 10 nm is formed on the barrier layer 405, and a protection layer 407 made of DLC and having a thickness of 3 nm is formed on the magnetic layer 406.

Table 2 illustrates the coercivity Hc (kOe) and the normalized coercivity variance ΔHc/Hc of each of the practical examples Emb2-1 through Emb2-12 and the comparison example Cmp2-1, measured in a manner similar to the coercivities Hc and the normalized coercivity variances ΔHc/Hc illustrated in Table 1.

From the results illustrated in Table 2, it is confirmed that the coercivity Hc is 36 kOe or higher, which is considerably high, and the normalized coercivity variances ΔHc/Hc is 0.29 or lower, which is considerably low, for each of the practical examples Emb2-1 through Emb2-12.

It is also confirmed that the coercivity Hc is 40 kOe or higher, and particularly high for the practical examples Emb2-1, Emb2-4, and Emb2-11 in which the barrier layer 405 is made of MgO, TiN, and TiC, respectively.

On the other hand, in the comparison example Cmp2-1 having no barrier layer 405, it is confirmed that the coercivity Hc is 19.0 kOe, which is lower than 20.0 kOe and considerably low. It may be regarded that, because the substrate 401 is heated to 600° C. when forming the magnetic layer 406 for the purposes of promoting the ordering of the magnetic layer 406 having the $L1_0$ type crystal structure, diffusion occurs at the boundary between the crystalline underlayer 404 and the magnetic layer 406, and the magnetic layer 406 cannot sufficiently exhibit the performance thereof.

It is confirmed from the results illustrated in Table 2 that the barrier layer 405 having the NaCl type structure is preferably provided between the crystalline underlayer 404 and the magnetic layer 406, in order to suppress diffusion at the boundary between the crystalline underlayer 404 and the magnetic layer 406 when forming the magnetic layer 406 that includes, as the main component thereof, an alloy having a good ordering and the $L1_0$ type crystal structure.

Practical Examples Emb3-1 Through Emb3-7 and Comparison Example Cmp3-1

A magnetic recording medium manufactured in accordance with practical examples Emb3-1 through Emb3-7 and a comparison example Cmp3-1 is manufactured in a manner similar to that for the practical example Emb2-11 described above, except for the crystalline underlayer 404 including W as the main component thereof. In the practical examples Emb3-1 through Emb3-7, the crystalline underlayer 404 including W as the main component thereof is made of W—Ni that is added with Ni within a range of 1 at % to 40 at %.

The crystalline underlayer 404 including W as the main component thereof is formed by W-1 at % Ni in the practical example Emb3-1, W-3 at % Ni in the practical example Emb3-2, W-5 at % Ni in the practical example Emb3-3, W-10 at % Ni in the practical example Emb3-4, W-20 at % Ni in the practical example Emb3-5, W-30 at % Ni in the practical example Emb3-6, and W-40 at % Ni in the practical example Emb3-7.

On the other hand, in the comparison example Cmp3-1, the crystalline underlayer 404 including W as the main component thereof is made of W-15 at % Ta.

The layer configuration and the processes of forming the layers for the practical examples Emb3-1 through Emb3-7 and the comparison example Cmp3-1 are similar to those of the practical example Emb2-11, except for the composition of the crystalline underlayer 404 including W as the main component thereof.

Table 3 illustrates the coercivity Hc of each of the practical examples Emb3-1 through Emb3-7 and the comparison example Cmp3-1, measured in a manner similar to the coercivities Hc illustrated in Table 2.

TABLE 3

| | Underlayer Including W as Main Component Thereof | Hc (kOe) |
|---|---|---|
| Emb3-1 | W-1 at % Ni | 32.8 |
| Emb3-2 | W-3 at % Ni | 36.1 |
| Emb3-3 | W-5 at % Ni | 38.2 |
| Emb3-4 | W-10 at % Ni | 39.4 |
| Emb3-5 | W-20 at % Ni | 39.5 |
| Emb3-6 | W-30 at % Ni | 36.5 |
| Emb3-7 | W-40 at % Ni | 33.1 |
| Cmp3-1 | W-15 at % Ta | 30.2 |

From the results illustrated in Table 3, it is confirmed that the coercivity Hc obtained in each of the practical examples Emb3-1 through Emb3-7 is higher than the coercivity Hc obtained in the comparison example Cmp3-1. It is also confirmed from these results that, when the Ni-content added to the crystalline underlayer 404 is within a range of 1 at % to 40 at % as in the case of the practical examples Emb3-1 through Emb3-7, the coercivity Hc is higher than 32 kOe and high. It is further confirmed from these results that, when the Ni-content added to the crystalline underlayer 404 is within a range of 3 at % to 30 at % as in the case of the practical examples Emb3-2 through Emb3-6, the coercivity Hc is higher than 36 kOe and considerably high.

In the practical examples Emb3-1 through Emb3-7, Ni is an example of one or more kinds of elements added to the crystalline underlayer 404 including W as the main component thereof. However, it is also confirmed that effects similar to the above described effects of adding Ni are also obtainable when the one or more kinds of elements added to the crystalline underlayer 404 including W as the main component thereof is/are selected from the group that includes Fe, Ni, Co, Hf, Zr, Y, Be, Ce, La, and Sc.

According to the embodiments and practical examples described above, it is possible to provide a magnetic recording medium employing the heat-assisted recording method or the microwave-assisted recording method, for example, and a magnetic storage apparatus including such a magnetic recording medium, which can improve the medium SNR without deteriorating the ordering of the crystal grains forming the $L1_0$ type alloy included in the magnetic layer.

What is claimed is:

1. A magnetic recording medium comprising:
   a substrate;
   a magnetic layer including an alloy having an $L1_0$ type crystal structure as a main component thereof; and
   a plurality of underlayers that are successively stacked and are arranged between the substrate and the magnetic layer,
   wherein the plurality of underlayers include at least one crystalline underlayer which has a (100) orientation, and includes W as a main component thereof and one or more kinds of elements selected from a group consisting of Fe, Ni, Co, Hf, Zr, Y, Be, Ce, La, and Sc.

2. The magnetic recording medium as claimed in claim 1, wherein the at least one crystalline underlayer further includes one or more kinds of elements selected from a group consisting of Mn, Ta, Nb, Ti, Cr, V, and Mo.

3. The magnetic recording medium as claimed in claim 1, wherein a total content of the one or more kinds of elements selected from the group consisting of Fe, Ni, Co, Hf, Zr, Y, Be, Ce, La, and Sc is within a range of 1 at % to 40 at %.

4. The magnetic recording medium as claimed in claim 1, wherein
the plurality of underlayers include an orientation control underlayer including one or more kinds of metals or alloys selected from a group consisting of Cr, alloys having a BCC (Body Centered Cubic) structure and including Cr as a main component thereof, and alloys having a B2 structure, and
the at least one crystalline underlayer is provided on the orientation control underlayer.

5. The magnetic recording medium as claimed in claim 1, further comprising:
a barrier layer arranged between the at least one crystalline underlayer and the magnetic layer,
wherein the barrier layer is made of one or more kinds of compounds selected from a group consisting of MgO, TiO, NiO, TiN, TaN, HfN, NbN, ZrC, HfC, TaC, NbC, and TiC.

6. The magnetic recording medium as claimed in claim 1, wherein the magnetic layer includes an FePt alloy or a CoPt alloy having the $L1_0$ type crystal structure as the main component thereof, and includes one or more kinds of materials selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, and BN.

7. A magnetic storage apparatus comprising:
a magnetic recording medium; and
a head configured to write information on and read information from the magnetic recording medium,
wherein the magnetic recording medium includes
a substrate;
a magnetic layer including an alloy having an $L1_0$ type crystal structure as a main component thereof; and
a plurality of underlayers that are successively stacked and are arranged between the substrate and the magnetic layer,
wherein the plurality of underlayers include at least one crystalline underlayer which has a (100) orientation, and includes W as a main component thereof and one or more kinds of elements selected from a group consisting of Fe, Ni, Co, Hf, Zr, Y, Be, Ce, La, and Sc.

8. The magnetic storage apparatus as claimed in claim 7, wherein the at least one crystalline underlayer of the magnetic recording medium further includes one or more kinds of elements selected from a group consisting of Mn, Ta, Nb, Ti, Cr, V, and Mo.

9. The magnetic storage apparatus as claimed in claim 7, wherein a total content of the one or more kinds of elements selected from the group consisting of Fe, Ni, Co, Hf, Zr, Y, Be, Ce, La, and Sc is within a range of 1 at % to 40 at %.

10. The magnetic storage apparatus as claimed in claim 7, wherein
the plurality of underlayers of the magnetic recording medium include an orientation control underlayer including one or more kinds of metals or alloys selected from a group consisting of Cr, alloys having a BCC (Body Centered Cubic) structure and including Cr as a main component thereof, and alloys having a B2 structure, and
the at least one crystalline underlayer is provided on the orientation control underlayer.

11. The magnetic storage apparatus as claimed in claim 7, wherein the magnetic recording medium further includes
a barrier layer arranged between the at least one crystalline underlayer and the magnetic layer,
wherein the barrier layer is made of one or more kinds of compounds selected from a group consisting of MgO, TiO, NiO, TiN, TaN, HfN, NbN, ZrC, HfC, TaC, NbC, and TiC.

12. The magnetic storage apparatus as claimed in claim 7, wherein the magnetic layer of the magnetic recording medium includes an FePt alloy or a CoPt alloy having the $L1_0$ type crystal structure as the main component thereof, and includes one or more kinds of materials selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, and BN.

13. The magnetic recording medium as claimed in claim 1, further comprising:
a seed layer made of a Cr alloy and provided on the substrate,
wherein the plurality of underlayers include an orientation control layer made of Cr or a Cr alloy and provided on the seed layer, the at least one crystalline underlayer provided on the orientation control layer, and a barrier layer made of one or more kinds of compounds selected from a group consisting of MgO, TiO, NiO, TiN, TaN, HfN, NbN, ZrC, HfC, TaC, NbC, and TiC and provided on the at least one crystalline underlayer, and
wherein the magnetic layer is provided on the barrier layer.

14. The magnetic recording medium as claimed in claim 1, further comprising:
a barrier layer arranged between the at least one crystalline underlayer and the magnetic layer,
wherein the barrier layer is made of one or more kinds of compounds selected from a group consisting of MgO, TiO, NiO, TiN, TaN, HfN, NbN, ZrC, HfC, TaC, NbC, and TiC,
wherein the plurality of underlayers include an orientation control underlayer including one or more kinds of metals or alloys selected from a group consisting of Cr, alloys having a BCC (Body Centered Cubic) structure and including Cr as a main component thereof, and alloys having a B2 structure, and
wherein the at least one crystalline underlayer is provided on the orientation control underlayer.

15. The magnetic storage apparatus as claimed in claim 7, wherein the magnetic recording medium further includes
a seed layer made of a Cr alloy and provided on the substrate,
wherein the plurality of underlayers include an orientation control layer made of Cr or a Cr alloy and provided on the seed layer, the at least one crystalline underlayer provided on the orientation control layer, and a barrier layer made of one or more kinds of compounds selected from a group consisting of MgO, TiO, NiO, TiN, TaN, HfN, NbN, ZrC, HfC, TaC, NbC, and TiC and provided on the at least one crystalline underlayer, and
wherein the magnetic layer is provided on the barrier layer.

16. The magnetic storage apparatus as claimed in claim 7, wherein the magnetic recording medium further includes
a barrier layer arranged between the at least one crystalline underlayer and the magnetic layer,
wherein the barrier layer is made of one or more kinds of compounds selected from a group consisting of MgO, TiO, NiO, TiN, TaN, HfN, NbN, ZrC, HfC, TaC, NbC, and TiC,
wherein the plurality of underlayers include an orientation control underlayer including one or more kinds of metals or alloys selected from a group consisting of Cr, alloys having a BCC (Body Centered Cubic) structure and including Cr as a main component thereof, and alloys having a B2 structure, and wherein the at least one crystalline underlayer is provided on the orientation control underlayer.

17. The magnetic recording medium as claimed in claim 1, wherein the magnetic layer has a coercivity higher than 36 kOe.

18. The magnetic storage apparatus as claimed in claim 7, wherein the magnetic layer of the magnetic recording medium has a coercivity higher than 36 kOe.

* * * * *